March 8, 1960   J. FLAMISCH ET AL   2,927,393
LIVE BAIT HOLDER
Filed Sept. 11, 1958   2 Sheets-Sheet 2
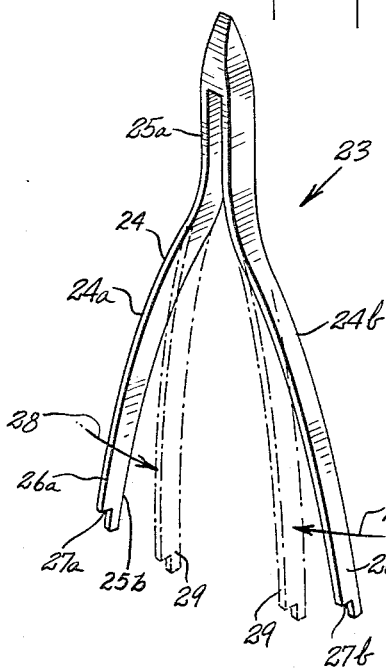
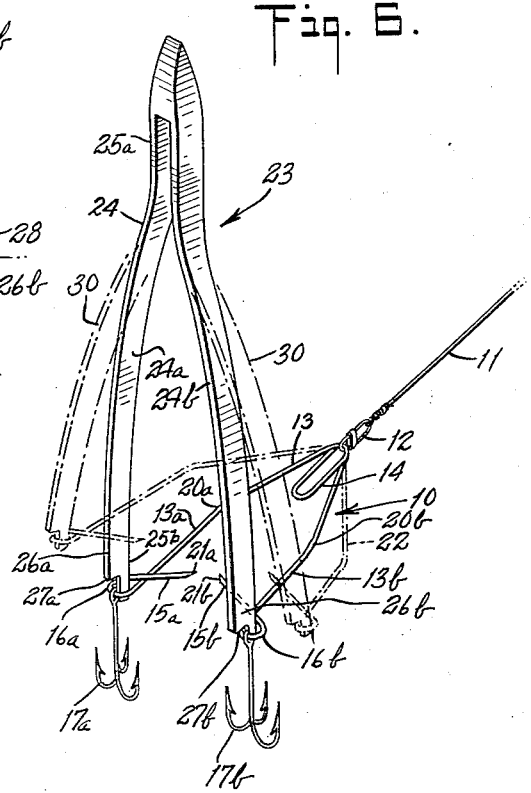
INVENTORS
JOSEPH FLAMISCH
BY JOHN FLAMISCH
ATTORNEYS

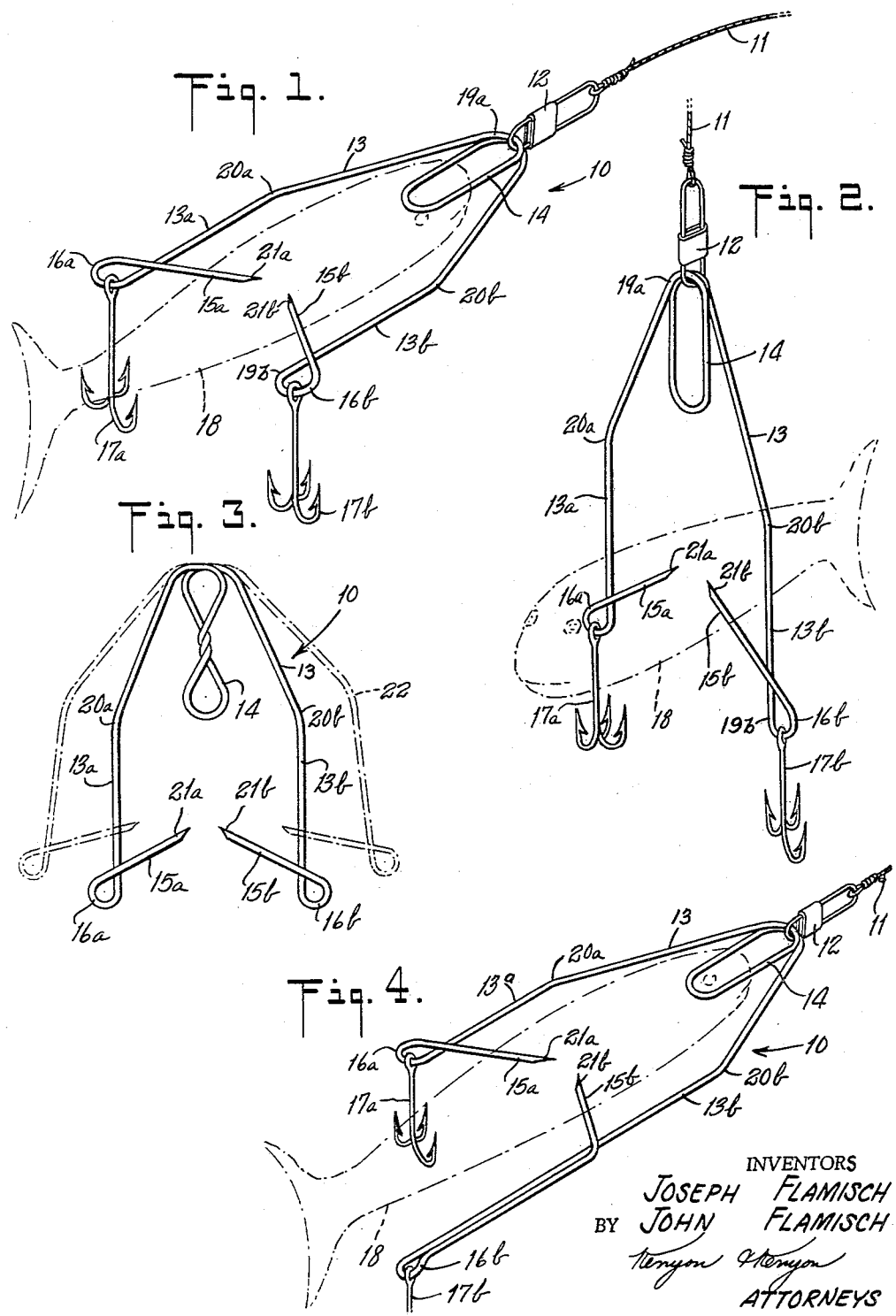

United States Patent Office 2,927,393
Patented Mar. 8, 1960

2,927,393

LIVE BAIT HOLDER

Joseph Flamisch, Allentown, and John Flamisch, Wescoesville, Pa.

Application September 11, 1958, Serial No. 760,479

8 Claims. (Cl. 43—44.2)

This invention relates to fishing, and more particularly to providing an improved bait holder for holding live bait such as a minnow, or other small fish at the end of a fishing line to entice and catch a larger, or game fish. The novel construction includes attachment means integral with such a bait holder for attaching fishhooks thereto in a manner to permit easy detachment and changing of the fishhooks. The invention further contemplates providing a tool to be used conjunctionally with such a bait holder to facilitate the mounting of live bait therein. Moreover, the invention is useful for casting, trolling and still-fishing.

Heretofore, many bait holders have been designed for the purpose intended, but most, if not all are ineffective. Many may cause the premature death of the bait fish, or its discolorment, or may not hold the bait fish in a natural condition, or inconspicuously so as to attract the game fish. Most may be designed without regard to convenience in attaching the bait.

It is therefore an object of the invention to provide an improved live bait holder which will not kill the bait fish prematurely, either by impalement or by suffocation, and which will not cause discolorment thereof due to such causes.

It is another object of the invention to provide a live bait holder useful in casting, trolling and still-fishing which will be relatively inconspicuous to a game fish, and which will permit a bait fish to appear to be swimming naturally so as to entice the game fish.

It is another object of the invention to provide a bait holder to which live bait, such as a small fish, may be attached in simple, practical and efficient manner involving little time and inconvenience to make the attachment.

It is a further object of the invention to provide a live bait holder including means integral therewith to attach conventional fishhooks thereto which may be easily interchanged accordingly as the needs or desires of the fisherman may change while he is fishing.

It is still a further object of the invention to provide a live bait holder including self-closing eye means for attaching fishhooks thereto in a manner permitting free movement of the hook in the water alongside the bait.

It is another object of the invention to provide a live bait holder wihch will be light in weight, and which will be extremely simple and inexpensive to construct out of ordinary materials.

Another object of the invention is to provide a simple, efficient tool adapted for use in conjunction with a novel bait holder construction to facilitate the mounting of live bait in the holder.

Generally described, the invention comprises providing a live bait holder for mounting a small fish therein in a manner to cause relatively little injury to such bait. The novel form of construction includes a generally U-shaped, resilient wire frame, the shank portions of which extend exteriorly of the bait fish one on either side thereof. A mouthpiece may extend centrally between the shanks from the closed end of the frame towards the bait for relatively harmless insertion into the mouth of the bait fish. A pair of prongs extends in inwardly biased manner, one from each shank near its free end, to hold the bait fish by pinch-like, impalement engagement at a location along its body length. The shape of the shanks may be such as to allow free movement of the gills of the bait fish for breathing. Fishhooks may be attached in free-swinging manner at self-closing attachment eyes formed integral with the bait holder, the hooks being readily detachable for interchange. A tweezer-like tool, adapted for use with the bait holder construction, provides convenience in mounting of bait. A leader, or other fishing line attachment means may be connected to the bait holder at its mouthpiece end, and the bait holder may be used in casting, trolling, or still-fishing.

The objects and achievements of the invention will become more fully apparent from the following detailed description, and by reference to the several figures of the drawings thereof in which like elements are similarly numbered throughout.

Figure 1 is a perspective view of a preferrel live bait holder construction as it may be used in troll-fishing.

Figure 2 is a perspective view of the same preferred form of live bait holder construction as it may be used in still-fishing.

Figure 3 is a profile view of a modified form of live bait holder construction.

Figure 4 is a perspective view to show another modified form of live bait holder construction as it may be used in troll-fishing.

Figure 5 is a perspective view of a tool for facilitating the mounting of bait in a live bait holder.

Figure 6 is a perspective view of such a tool in engagement with a novel bait holder construction to be described.

Referring to Figures 1 through 4, a live bait holder 10 is attached to a fishing line 11 by a leader attachment 12, or by other fishing line attachment means. The bait holder 10 is generally comprised of a generally U-shaped frame 13 having spaced apart shank portions 13a and 13b, a bait mouthpiece 14, and a pair 15 of bait impaling prongs 15a and 15b. Fishhook attachment eyes 16 may be generally located along the length of each shank portion 13a and 13b, as shown at 16a and 16b, for attachment of fishhooks 17a and 17b to bait holder 10. Fishhooks 17 may be of a type adapted for free-swinging movement when attached to bait holder 10 alongside the live bait 18 which is mounted in the bait holder 10, as indicated in the drawings.

The novel bait holder construction is adapted to fabrication from a single strand of resilient material, such as springy wire, in the manner shown in the drawings. However, it may be fabricated by built-up, or other construction without departing from the principles of the invention.

A preferred construction of a bait holder appears in Figures 1 and 2. The generally U-shaped frame 13 may be said to have a closed end 19a, and an open end 19b. The mouthpiece 14 effectively depends from closed end 19a, as indicated in the drawings, and is located centrally and generally within the plane of shank portions 13a and 13b, extending in the direction of the bait 18. Where bait holder 10 is formed from a single strand of springy wire or similar material, the wire may be looped at the closed end 19a of the frame in the manner illustrated, the loop forming mouthpiece 14. The length of the mouthpiece may vary according to preference and relative size of the bait, the length being imparted by elongating the loop which forms the same. An alternative, or modified form of mouthpiece is shown in Figure 3. The loop forming the mouthpiece has been elongated and twisted, or rotated in axial manner several halfturns about itself. Even a single half-turn of twist may bring about the desired effect, which is to stiffen and strengthen the mouthpiece as may be desirable for mounting a relatively large or active bait fish.

Curved portions 20a and 20b may be integrally formed along the length of each of the shank portions 13a and 13b to shape the shanks so as to provide clearance between the bait holder and the bait. This clearance may be especially useful in the region of the gills of the bait to permit natural breathing-movement thereof which may prevent suffocation of the bait. Accordingly, curved portions 20a and 20b should be located so as to be laterally proximate the gills of the bait.

The fishhook attachment eyes 16a and 16b may be correspondly located to be opposite each other along shanks portions 13a and 13b, as shown in Figures 1, 2 and 3, or may be located anywhere therealong, as shown in Figure 4. Where the bait holder 10 is made from a single strand of wire, the eyes 16 may be formed by bending the frame-forming wire at or near the free ends of shank portions 13a and 13b first in outward direction of the bait holder, and then inwardly to form a loop, the wire having been extended in length beyond eyes 16 at said free ends. The inwardly bent free end of each shank portion is pressed against the shank portion itself where it laps the same to cause the fishhook attachment eyes 16a and 16b to be self-closing. That is, the fishhook will snap into, and be locked within the attachment eye by the action of the lap of the wire. Where a fishhook attachment eye 16b is located to be proximate a tail portion of the bait 18, as shown in Figure 4, the eye may be made self-closing in generally the same manner, as will become apparent by reference to the drawing.

The bait impaling prongs 15a and 15b, which include sharpened end points 21a and 21b, extend inwardly of the U-shaped frame 13 generally from the free ends of shank portions 13a and 13b. The prongs engage a body portion of the bait by impalement under pinch-like action, as will appear from the drawings. Such engagement may be at a point beneath the backbone of the bait, or at the gills as by passing the prongs through the opening of the gills. The prongs 15a and 15b may be also bent in a direction toward the closed end 19a to prevent the bait from slipping off the mouthpiece when mounted in the bait holder. Where the bait holder is of built-up construction, the prongs 15a and 15b may be attached to and extend from either the shank portions 13a and 13b or the eyes 16a and 16b. Where the bait holder is formed from a single strand of wire, they may be formed by extensions of the frame-forming wire at the free ends of shank portions 13a and 13b. This is done simply by extending the length of each shank inwardly of the frame 13 beyond its aforesaid inward bend which completes the loop forming the fishhook attachment eyes 16a and 16b. The resiliency of the frame 13, and consequently the shank portions 13a and 13b permits the prongs 15a and 15b to be spread apart to clear the bait while being mounted on the mouthpiece in the bait holder, and causes the prongs to spring back inwardly for pinch-like engagement and impalement of the bait. The spread apart position described is generally indicated by dotted lines 22 in Figures 3 and 6. Note that the inward springing movement of the shank portions 13a and 13b returning from the spread position causes effective rotation of prongs 15a and 15b towards the mounthpiece 14. This further ensures entrapment of the bait on the mouthpiece.

Referring to Figures 5 and 6, a tweezer-like tool 23 is provided for facilitating the mounting of live bait in the novel bait holder construction described. Tool 23 is formed by a resilient, generally wishbone-shaped frame 24 having spaced apart leg portions 24a and 24b, a closed end 25a, and an open end 25b. The leg portions 24a and 24b diverge toward the free ends 26a and 26b thereof. Free ends 26a and 26b are adapted, or shaped for engagement with bait holder 10 by insertion in eyes 16a and 16b thereof. The shape of free ends 26a and 26b may include shoulder portions 27a and 27b to prevent sliding through or wedging of the tool within eyes 16a and 16b, the shoulder portions resting on the loop of the eye. In the normal condition, free ends 26a and 26b are spaced apart a distance greater than that of eyes 16a and 16b in bait holder 10. Thus, manual squeezing pressure must be applied to the leg portions 24a and 24b in the direction of the arrows 28 in Figure 5 to partially close the tool when orienting free ends 26a and 26b over eyes 16a and 16b for engagement therewith. The tool 23 as partially closed is shown by Figure 6, and by the dotted lines 29 of Figure 5. When manual pressure on the tool is released, the resilient nature of the frame 24, and consequently the leg portions 24a and 24b causes free ends 26a and 26b to spring outwardly to return to their natural, fully opened position.

Figure 6 shows a convenient means for mounting a live bait 18 on a bait holder 10 having the construction described. Dotted lines 30 represent the tool 23 in its normal, fully opened condition, the free ends thereof being spaced apart a distance greater than the lateral distance between eyes 16a and 16b of the bait holder. The tool 23 is positioned with respect to bait holder 10 such that each of the free ends 26a and 26b thereof may be oriented with respect to one of the eyes 16a and 16b for insertion engagement. The tool 23 is partially closed by squeezing pressure, its free ends then being substantially in alignment over both eyes. The tool 23 is inserted in the eyes 16a and 16b and permitted to spring to its natural open position 30 by releasing the manual squeezing pressure. Thus, the prongs 15a and 15b of the bait holder 10 are sprung apart by the tool so that the bait 18 may be mounted in the bait holder. The tool remains in engagement with the bait holder until the mouth of the bait has been located on the mouthpiece, or until it is desired to impale the bait on the prongs 15a and 15b. At such time the tool 23 is lifted, or removed from engagement with the bait holder, permitting the prongs 15a and 15b to spring inwardly in pinch-like manner to impale the bait. The impaling action described may include slight squeezing pressure on the tool upon engagement of the prongs with the bait such as in the case where the bait fish is smaller than normal size or where its skin is particularly tough. Thus, a novel means for facilitating the mounting of live bait in a bait holder has been devised.

A novel bait holder construction also has been devised to achieve all of the aforesaid objects. It is to be understood that other modified forms of the invention might be made without departing from the principles thereof. Accordingly, the invention should not be limited in scope to the particular embodiments described, but the principles thereof are applicable wherever the objects of the invention are sought to be achieved.

What is claimed is:

1. A bait holder for securing a live bait to a fishing line comprising a generally U-shaped frame, the shank portions of said frame being spring-biased towards each other, fishhook attachment means in each of said shank portions, bait impaling prongs at the open end of said frame to extend from substantially the free ends of said shank portions, said prongs pointing inwardly of said frame and extending substantially within the plane of said shank portions whereby said shank portions bias the prongs towards each other, the bias of each prong being toward that shank portion of said frame which is opposite thereto, a bait-mouthpiece at the closed end of said frame to extend therefrom centrally of said frame in direction towards said open end of the frame substantially within said plane of the shank portions, said mouthpiece being relatively short and smooth for substantially harmless insertion into the mouth of said bait, and means for attaching a fishing line to said bait holder, whereby said bait is attached between said mouthpiece and said prongs by impalement between the latter.

2. A bait holder for securing a live bait fish to a fishing line comprising a generally U-shaped wire frame, the shank portions of said frame being spring-biased towards each other, a curved portion in each of said shank portions along its length to provide movement clearance for the gills of said bait fish, fishhook attachment means in each of said shank portions, bait impaling prongs at the open end of said frame to extend from substantially the free ends of said shank portions, said prongs pointing inwardly of said frame and extending substantially within the plane of said shank portions whereby said shank portions bias the prongs towards each other, the bias of each prong being toward that shank portion of said frame which is opposite thereto, a bait-mouthpiece at the closed end of said frame to extend therefrom centrally of said frame in direction towards said open end of the frame substantially within said plane of the shank portions, said mouthpiece being relatively short and smooth for substantially harmless insertion into the mouth of said bait, and means for attaching a fishing line to said bait holder, whereby said bait fish is attached between said mouthpiece and said prongs by impalement between the latter.

3. A bait holder for securing a live bait to a fishing line comprising a generally U-shaped wire frame, the shank portions of said frame being spring-biased towards each other, fishhook attachment means in each of said shank portions, bait impaling prongs at the open end of said frame to extend from substantially the free ends of said shank portions, said prongs pointing inwardly of said frame and extending substantially within the plane of said shank portions whereby said shank portions bias the prongs towards each other, the bias of each prong being toward that shank portion of said frame which is opposite thereto, a bait-mouthpiece at the closed end of said frame to extend therefrom centrally of said frame in direction towards said open end of the frame substantially within said plane of the shank portions, said mouthpiece being relatively short and smooth for substantially harmless insertion into the mouth of said bait and being formed integrally with said frame by a loop of said frame-forming wire in said closed end of the frame, and means for attaching a fishing line to said bait holder, whereby said bait is attached between said mouthpiece and said prongs by impalement between the latter.

4. A bait holder for securing a live bait to a fishing line comprising a generally U-shaped wire frame, the shank portions of said frame being spring-biased towards each other, fishhook attachment means in each of said shank portions, bait impaling prongs at the open end of said frame to extend from substantially the free ends of said shank portions, said prongs pointing inwardly of said frame and extending substantially within the plane of said shank portions whereby said shank portions bias the prongs towards each other, the bias of each prong being toward that shank portion of said frame which is opposite thereto, a bait-mouthpiece at the closed end of said frame to extend therefrom centrally of said frame in direction towards said open end of the frame substantially within said plane of the shank portions, said mouthpiece being relatively short and smooth for substantially harmless insertion into the mouth of said bait and being formed integrally with said frame by a loop of said frame-forming wire in said closed end of the frame, said mouthpiece-forming loop being elongated in the direction of said open end of the frame and being twisted at least a single half-turn about itself along its elongated length, and means for attaching a fishing line to said bait holder, whereby said bait is attached between said mouthpiece and said prongs by impalement between the latter.

5. A bait holder for securing a live bait to a fishing line comprising a generally U-shaped frame formed from a single strand of resilient wire, the shank portions of said frame being spring-biased towards each other, a self-closing fishhook attachment eye in each of said shank portions, said eyes being formed integrally with said frame by a loop of said frame-forming wire in each of said shank portions whereby fishhooks may be easily attached thereto and detached therefrom, bait impaling prongs at the open end of said frame to extend from substantially the free ends of said shank portions, said prongs pointing inwardly of said frame and extending substantially within the plane of said shank portions whereby said shank portions bias the prongs towards each other, the bias of each prong being toward that shank portion of said frame which is opposite thereto, a bait-mouthpiece at the closed end of said frame to extend therefrom centrally of said frame in direction towards said open end of the frame substantially within said plane of the shank portions, said mouthpiece being relatively short and smooth for substantially harmless insertion into the mouth of said bait and being formed integrally with said frame by a loop of said frame-forming wire in said closed end of the frame, and means for attaching a fishing line to said bait holder, whereby said bait is attached between said mouthpiece and said prongs by impalement between the latter.

6. A bait holder for securing a live bait to a fishing line comprising a generally U-shaped frame, the shank portions of said frame being of different length and spring-biased towards each other, fishhook attachment means in each of said shank portions at the free ends thereof, bait impaling prongs toward the open end of said frame to extend one from substantially the free end of the shorter of said shank portions and the other substantially opposite thereto from a point along the longer of said shank portions, said prongs pointing inwardly of said frame and extending substantially within the plane of said shank portions whereby said shank portions bias the prongs towards each other, the bias of each prong being toward that shank portion of said frame which is opposite thereto, a bait-mouthpiece at the closed end of said frame to extend therefrom centrally of said frame in direction towards said open end of the frame substantially within said plane of the shank portions, said mouthpiece being relatively short and smooth for substantially harmless insertion into the mouth of said bait, and means for attaching a fishing line to said bait holder, whereby said bait is attached between said mouthpiece and said prongs by impalement between the latter, and whereby a fishhook may be attached to said bait holder proximate a middle body portion of said bait and a second fishhook may be attached to said bait holder proximate a tail portion of said bait.

7. A bait holder for securing a live bait to a fishing line comprising a generally U-shaped frame formed from a single strand of resilient wire, the shank portions of said frame being spring-biased towards each other, a curved portion in each of said shank portions along its length to provide movement clearance for the gills of said bait fish, a self-closing fishhook attachment eye in each of said shank portions, said eyes being formed integrally with said frame by a loop of said frame-forming wire in each of said shank portions whereby fishhooks may be easily attached thereto and detached therefrom, bait impaling prongs at the open end of said frame to extend substantially from the free ends of said shank portions, said prongs being formed integrally with said frame by extension of said frame-forming wire at the free ends of said shank portions, said prongs pointing inwardly of said frame and extending substantially within the plane of said shank portions whereby said shank portions bias the prongs towards each other, the bias of each prong being toward that shank portion of said frame which is opposite thereto, said prongs also being bent slightly towards the closed end of said frame, a bait-mouthpiece at the closed end of said frame to extend therefrom centrally of said frame in direction towards said open end of the frame substantially within said plane of the shank portions, said mouthpiece being relatively short and smooth for substantially harmless insertion into the mouth of said bait and being formed integrally with said frame by a loop of said frame-forming wire in said closed end of the frame, and means for attaching a fishing line to said bait holder, whereby said bait is attached between said mouthpiece and said prongs by impalement between the latter.

8. A bait holder for securing a live bait to a fishing line comprising a generally U-shaped frame formed from a single strand of resilient wire, the shank portions of said frame being spring-biased towards each other, a curved portion in each of said shank portions along its length to provide movement clearance for the gills of said bait fish, a self-closing fishhook attachment eye in each of said shank portions, said eyes being formed integrally with said frame by a loop of said frame-forming wire in each of said shank portions whereby fishhooks may be easily attached thereto and detached therefrom, bait impaling prongs at the open end of said frame to extend substantially from the free ends of said shank portions, said prongs being formed integrally with said frame by extension of said frame-forming wire at the free ends of said shank portions, said prongs pointing inwardly of said frame and extending substantially within the plane of said shank portions whereby said shank portions bias the prongs towards each other, the bias of each prong being toward that shank portion of said frame which is opposite thereto, said prongs also being bent slightly towards the closed end of said frame, a bait-mouthpiece at the closed end of said frame to extend therefrom centrally of said frame in direction towards said open end of the frame substantially within said plane of the shank portions, said mouthpiece being relatively short and smooth for substantially harmless insertion into the mouth of said bait and being formed integrally with said frame by a loop of said frame-forming wire in said closed end of the frame, said mouthpiece-forming loop being elongated in the direction of said open end of the frame and being twisted at least a single half-turn about itself along its elongated length, and means for attaching a fishing line to said bait holder, whereby said bait is attached between said mouthpiece and said prongs by impalement between the latter.

References Cited in the file of this patent

UNITED STATES PATENTS

| | | |
|---|---|---|
| 1,095,288 | Rosenberg | May 5, 1914 |
| 1,660,617 | Johns | Feb. 28, 1928 |
| 2,017,333 | Zuck | Oct. 15, 1935 |
| 2,836,922 | Cox | June 3, 1958 |

FOREIGN PATENTS

| | | |
|---|---|---|
| 336,483 | France | Jan. 16, 1904 |
| 490,356 | Canada | Feb. 10, 1953 |
| 906,476 | France | May 14, 1945 |